(12) United States Patent
Spear et al.

(10) Patent No.: US 6,193,247 B1
(45) Date of Patent: Feb. 27, 2001

(54) PORTABLE STACKABLE WAGON ASSEMBLY

(75) Inventors: Kenneth J. Spear, Vienna; Rudy F. Planthaber, Mineral Wells, both of WV (US); Steven F. Brooker, Marietta, OH (US)

(73) Assignee: O. Ames Co., DE (US)

( * ) Notice: Subject to any disclaimer, the term of this patent is extended or adjusted under 35 U.S.C. 154(b) by 0 days.

(21) Appl. No.: 09/263,211

(22) Filed: Mar. 5, 1999

Related U.S. Application Data

(60) Provisional application No. 60/076,932, filed on Mar. 5, 1998.

(51) Int. Cl.[7] .................................................. B62B 3/02
(52) U.S. Cl. .................................. 280/33.998; 280/47.35; 280/47.371
(58) Field of Search ..................... 280/30, 33.991, 280/33.992, 33.998, 47.34, 47.35, 47.371, 79.11, 79.2, 79.5, 87.043, 655.1; 224/400, 409, 411

(56) References Cited

U.S. PATENT DOCUMENTS

| | | | |
|---|---|---|---|
| 2,532,004 | * 11/1950 | Zepp ................................ 280/47.35 |
| 3,376,046 | * 4/1968 | Kivett et al. ..................... 280/33.998 |
| 3,472,392 | * 10/1969 | Hahn ................................. 280/47.35 |
| 3,522,955 | * 8/1970 | Warner, Jr. ........................ 280/655.1 |
| 4,220,343 | * 9/1980 | Robinson ........................ 280/33.998 |
| 4,460,188 | * 7/1984 | Maloof .............................. 280/655.1 |
| 5,441,289 | * 8/1995 | Spielberger ..................... 280/47.371 |
| 5,460,391 | * 10/1995 | Gantz et al. ...................... 280/47.35 |
| 5,507,507 | * 4/1996 | Davidson ........................ 280/33.992 |
| 5,645,290 | * 7/1997 | Gaffney et al. ................. 280/33.998 |
| 5,785,328 | * 7/1998 | Eckloff ............................ 280/33.998 |
| 5,816,586 | * 10/1998 | Richmond ........................ 280/47.34 |

FOREIGN PATENT DOCUMENTS

| | | | |
|---|---|---|---|
| 2252536 | * 8/1992 | (GB) ................................ 280/47.35 |
| 2265603 | * 10/1993 | (GB) ............................. 280/33.998 |
| 40-6-9021 | * 1/1994 | (JP) .................................. 280/47.35 |

* cited by examiner

*Primary Examiner*—Frank Vanaman
(74) *Attorney, Agent, or Firm*—W. Warren Taltavull; Farkas & Manelli PLLC

(57) ABSTRACT

A portable, stackable wagon assembly includes a main compartment over which a handle structure is movable to an operational position; the main compartment includes side walls provided with support members for a tray that is insertable into the main compartment to rest on the support members; the tray is provided with at least one partition wall and a handle to facilitate removal from the wagon assembly.

7 Claims, 6 Drawing Sheets

PORTABLE STACKABLE WAGON ASSEMBLY

This application claims the benefit of Provisional Application Ser. No. 60/076,932, filed Mar. 5, 1998.

BACKGROUND OF THE INVENTION

The present invention relates to wagon assemblies, and more particularly, to wagon assemblies of the stackable type. The present invention also relates to wagon assemblies having a removable tray structure.

Conventionally, a wagon has a rectangular body with a main compartment configured to carry items and materials therein. A set of wheels rollingly support the conventional wagon. A handle is provided so that the wagon can be rolled manually by pulling on the handle. The conventional wagon, however, presents a number of problems and shortcomings.

Conventional wagons cannot be stacked on top of one another in a stable relation. Thus, in order to ship conventional wagons a manufacturer has two options. First, the manufacturer may ship the conventional wagons fully assembled. However, shipment of fully assembled conventional wagons greatly increases the shipping costs. Second, the conventional wagons may be shipped disassembled. When the conventional wagon is shipped disassembled, however, either the retailer or the consumer must assemble the individual parts and components of the wagon. By placing the responsibility on the retailer and consumer to assemble the conventional wagon, there is a possibility that individual components or parts may be lost or damaged. Also, shipping the wagons unassembled provides opportunities for individual components to become lost or broken during the shipping process.

Conventional wagons also fail to provide an adequate surface on which gardeners can arrange certain items and materials during gardening and lawn care activities. Typically, a gardener must take the items he or she wishes to use from the wagon and lay them upon the ground. This provides a greater opportunity for the gardener to lose those items placed on the ground and for dirt and other debris to collect on those items.

There is also a lack of conventional wagons which provide extra storage in addition to the storage provided by the wagon body itself. Furthermore, there is a lack of conventional wagons having an additional storage compartment which may be removed and carried independently of the wagon assembly. In the conventional wagon, all the items and materials are carried in one main compartment. In certain situations, it is not desirable to carry certain items and materials together in the same compartment. A wagon assembly having additional storage compartments allows certain items and materials used in gardening and lawn care activities to be carried separately from the main compartment and allows access to those items and materials carried therein. Furthermore, providing an additional storage compartment in the form of a removable tray structure not only allows a user to store certain items and materials separate from those stored in the main compartment, but also permits the user to simply remove the tray structure from the wagon body structure and transport it to a desired location without having to manually pull the entire wagon assembly.

Accordingly, it is an object of the present invention to provide a wagon assembly which obviates the problems associated with conventional wagons discussed above. Set forth hereinbelow is a detailed description of a specific and preferred embodiment of a wagon assembly constructed in accordance with the principles of the present invention.

DETAILED DESCRIPTION OF THE DRAWINGS

Figure 1:
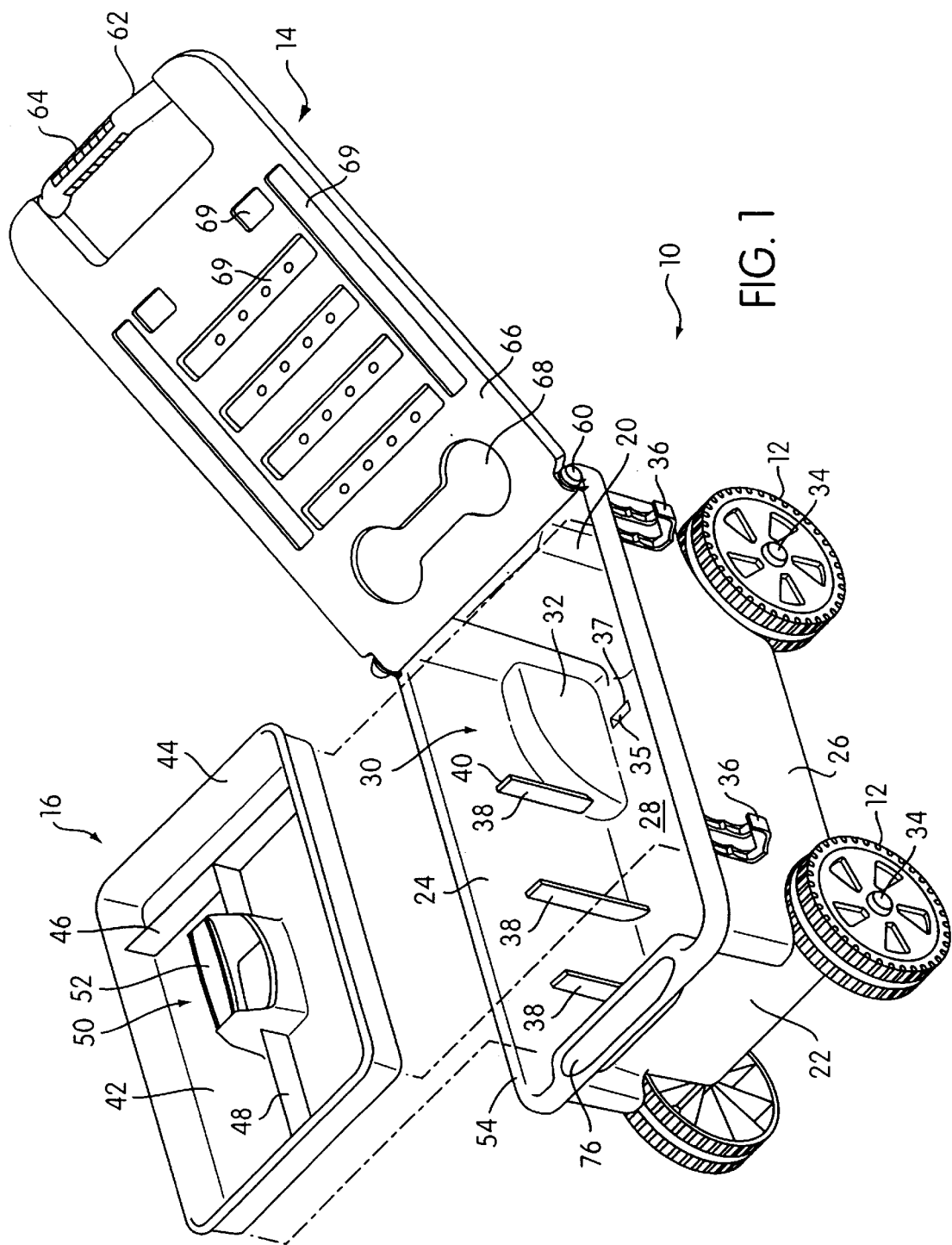
FIG. 1 is a perspective rear view of a wagon assembly embodying the principles of the present invention with a handle structure in an operating position and a removable tray structure shown in an exploded view with respect to a wagon body structure of the wagon assembly.
Figure 2:
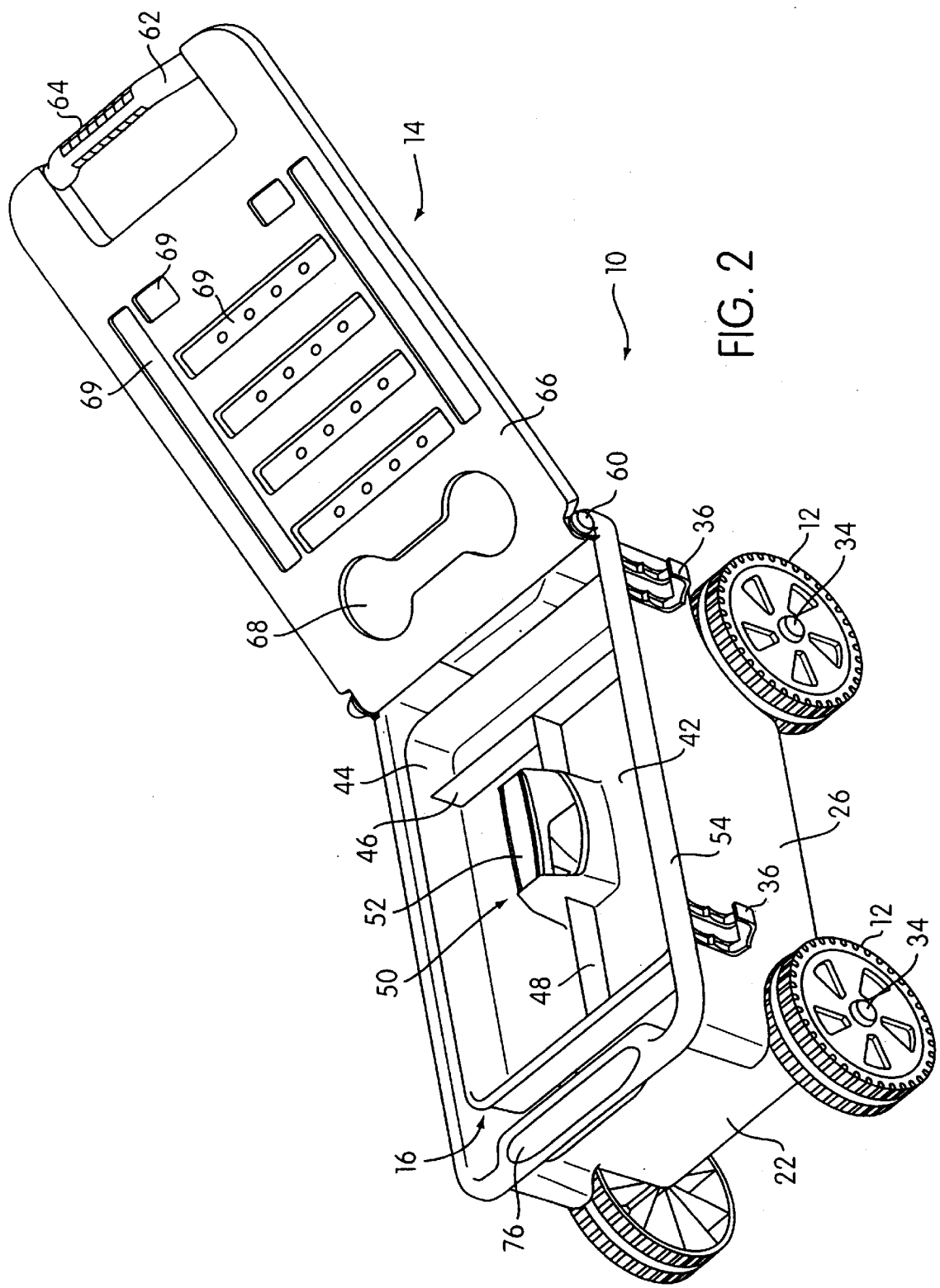
FIG. 2 shows the wagon assembly of FIG. 1 with the removable tray structure disposed within the wagon body structure.

Referring more particularly to the drawings, a wagon assembly embodying the principles of the present invention, generally designated at 10, is shown in FIGS. 1–6. The wagon assembly 10 comprises three major components: a wagon body structure, generally designated 18, rollingly supported by annular wheel structures 12; a handle structure 14 pivotally mounted to the front end of the wagon body structure 18; and a removable tray structure, generally designated 16, which is removably carried by the wagon body structure 18.

As best seen in FIG. 1, the wagon body structure 18 has a front wall 20, a rear wall 22, and a pair of opposing side walls 24, 26. The wagon body structure 18 also has a floor 28. Together, the four walls and the floor of the wagon body structure 18 provide an open and upwardly facing main compartment 30. The main compartment 30 is constructed and arranged to accommodate the carriage of a variety of items and materials which are used in gardening and lawn care activities. Such items and materials may include, among other things, soil, seeds, lawn ornaments, and gardening tools.

Figure 4:
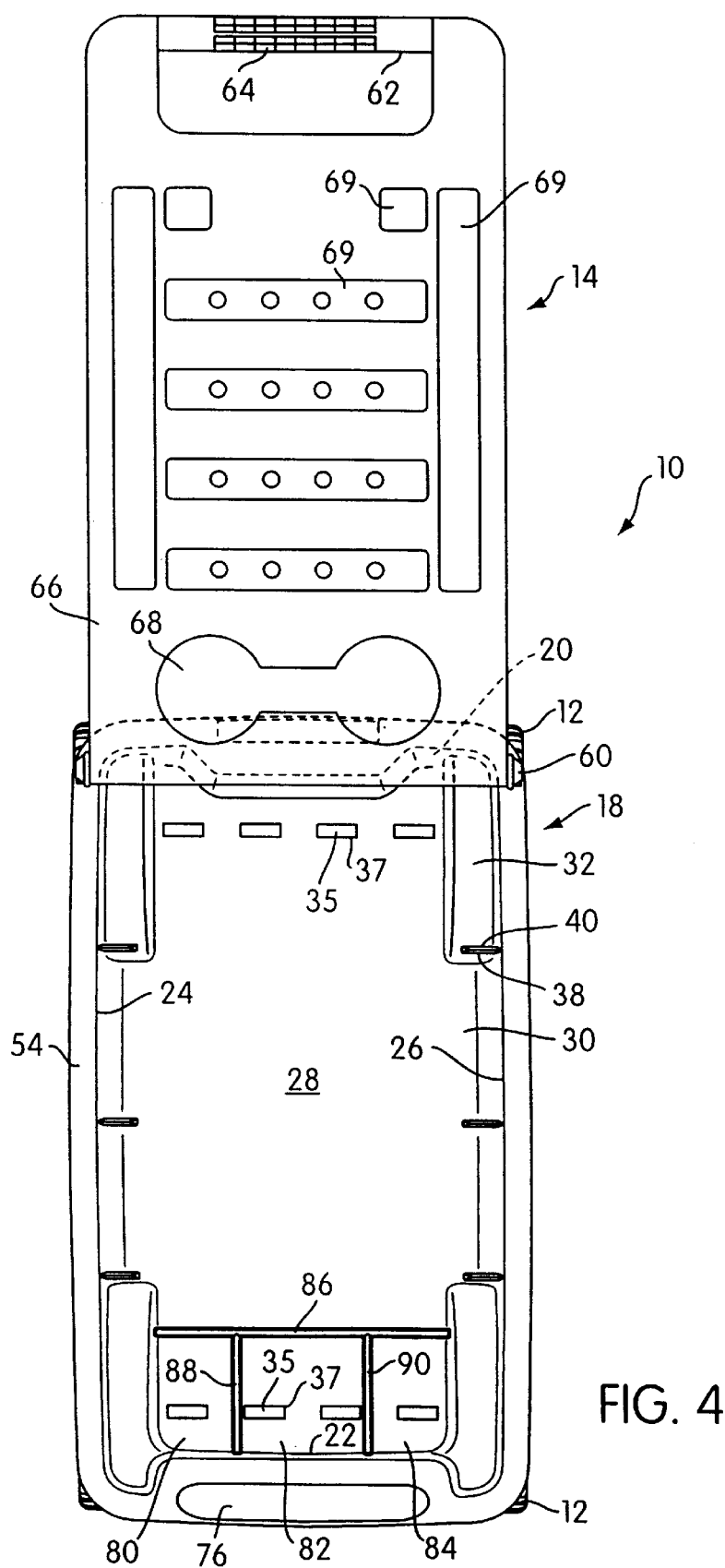
FIG. 4 shows a top plan view of the wagon assembly of FIG. 1 with the handle structure in its forwardmost operative position.

The side walls 24, 26 of the wagon body structure 18 each have a set of wheel structure recesses 32 which extend inwardly with respect to the main compartment 30. Each of these wheel structure recesses 32 has an axle 34 extending outwardly and sidewardly therefrom for rotatably mounting the annular wheel structures 12. The axles 34 are rotatably retained within axle retaining structures 35 which are fixed to the bottom surface of the wagon body structure 18. The axle retaining structures 35 are U-shaped and extend downwardly from the wagon body structure 18. As can be seen in FIG. 4, the axle retaining structures 35 are disposed below perforations 37 formed in the floor 28 of the wagon body structure 18. Also, in the embodiment shown in the accompanying figures, the front wheel structures 12 are rotatably mounted in such a manner that they do not turn to the left or right as a user steers the wagon assembly 10 by pulling on the handle structure 14. Thus, the user steers the wagon assembly 10 simply by pulling on the handle structure 14 and dragging the front wheel structures 12 across the ground. However, it is also to be understood that either the front or rear wheel structures 12 may be mounted in such a manner that they can be pivoted in a steering direction as a user pulls the handle structure 14 in a right or left desired direction.

Each side wall 24, 26 of the wagon body structure 18 also includes a set of tool clip elements 36. The tool clip elements 36 are configured to detachably hold tools with larger diameter handles, such as rakes, hose, edgers, etc. The tool clip elements 36 are constructed in accordance with the teachings of commonly owned U.S. patent application Ser. No. 08/584,208, the disclosure of which is hereby incorporated by reference into the present application. Tools with large diameter handles are retained by the tool clip elements 36 by a snap-in action.

A number of tray supporting structures 38 are provided in the main compartment 30 of the wagon body structure 18. In the present embodiment, these tray supporting structures 38 comprise a plurality of ribs extending upwardly on the interior surface of the side walls 24, 26. Each of these ribs provides an upwardly facing tray supporting surface 40. These tray supporting structures 38 are constructed and arranged to removably support the tray structure 16 in a stable position when it is being removably carried by the wagon assembly 10.

The tray structure 16 includes a bottom wall 42 having an outer peripheral wall 44 extending upwardly therefrom. The tray structure 16 is partitioned into separate, independent storage compartments. Specifically, partition 46 extends laterally across tray structure 16 and partition 48 intersects with partition 46 to divide the tray structure 16 into three storage compartments. A handle member 50 is formed integral with partition 48 and provides a grip portion 52. The handle member 50 and grip portion 52 are configured to allow a user to manually grasp the grip portion 52 and lift the tray structure 16 from its removably carried position within the main compartment 30 of the wagon body structure 18, thereby allowing the user to carry the tray structure 16 and the items and materials contained therein independently from the wagon assembly 10.

Figure 6:
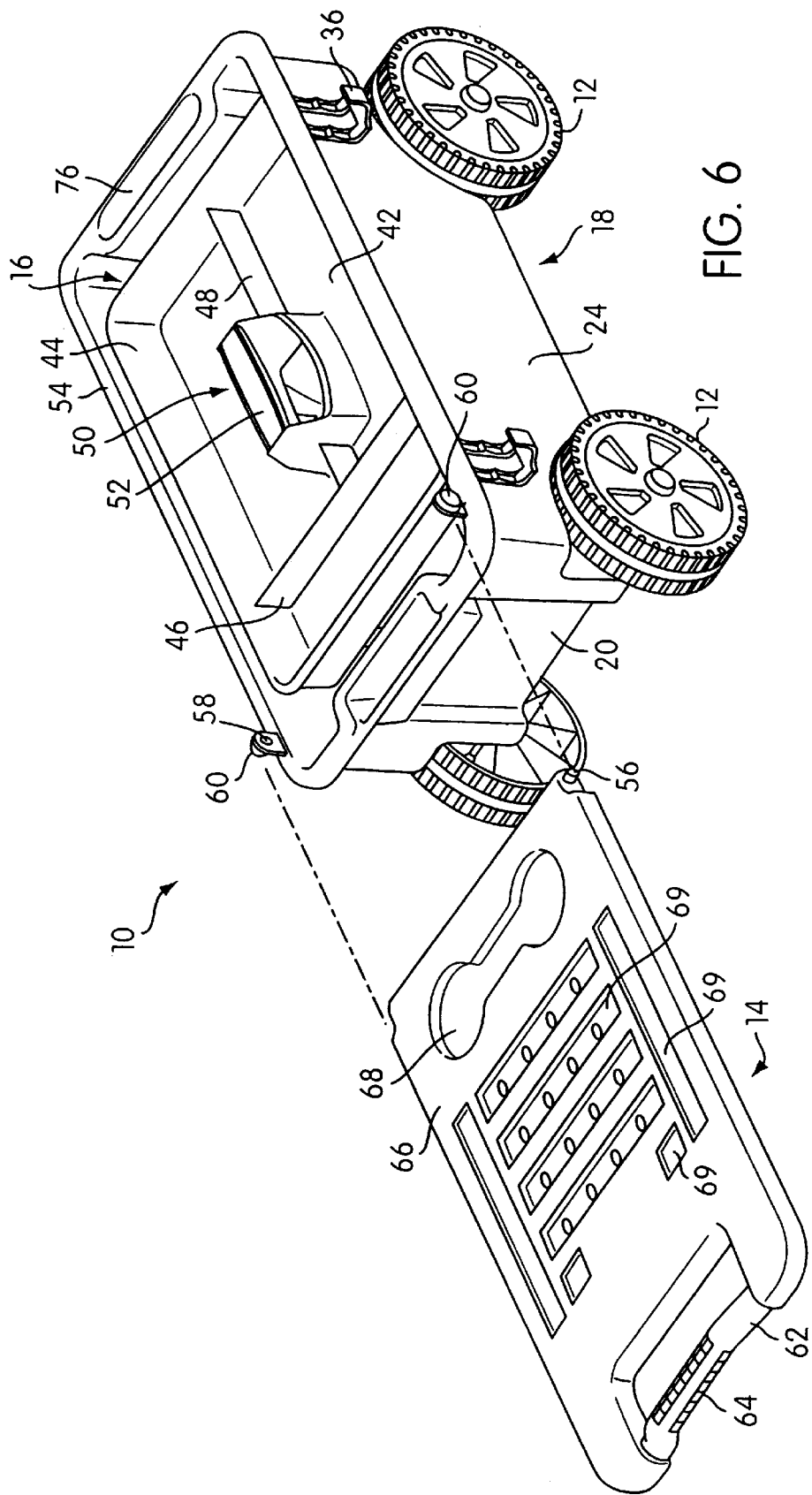
FIG. 6 shows the wagon assembly of FIG. 1 with the handle structure in an exploded view with respect to the wagon assembly.

The handle structure 14 has a planar, rectangular shape with a length and width substantially the same as that of an upper periphery 54 of the wagon body structure 18. One end of the handle structure 14 has a pair of pivot pins 56 extending outwardly from opposing sides thereof. As best shown in FIG. 6, these pivot pins 56 are adapted to be pivotally received in pivot bores 58 of a set of connecting structures 60 formed integral with the upper periphery 54 of the wagon body structure 18. The handle structure 14 has a transversely extending gripping portion 62 at the end opposite the pivot pins 56. The gripping portion 62 has an etched gripping pattern 64 for enhancing manual grasping of the handle member 14. The gripping portion 62 is constructed and arranged to allow a user to manually pull the wagon assembly 10 and steer it by pulling the handle structure 14 in a desired steering direction.

Figure 5:
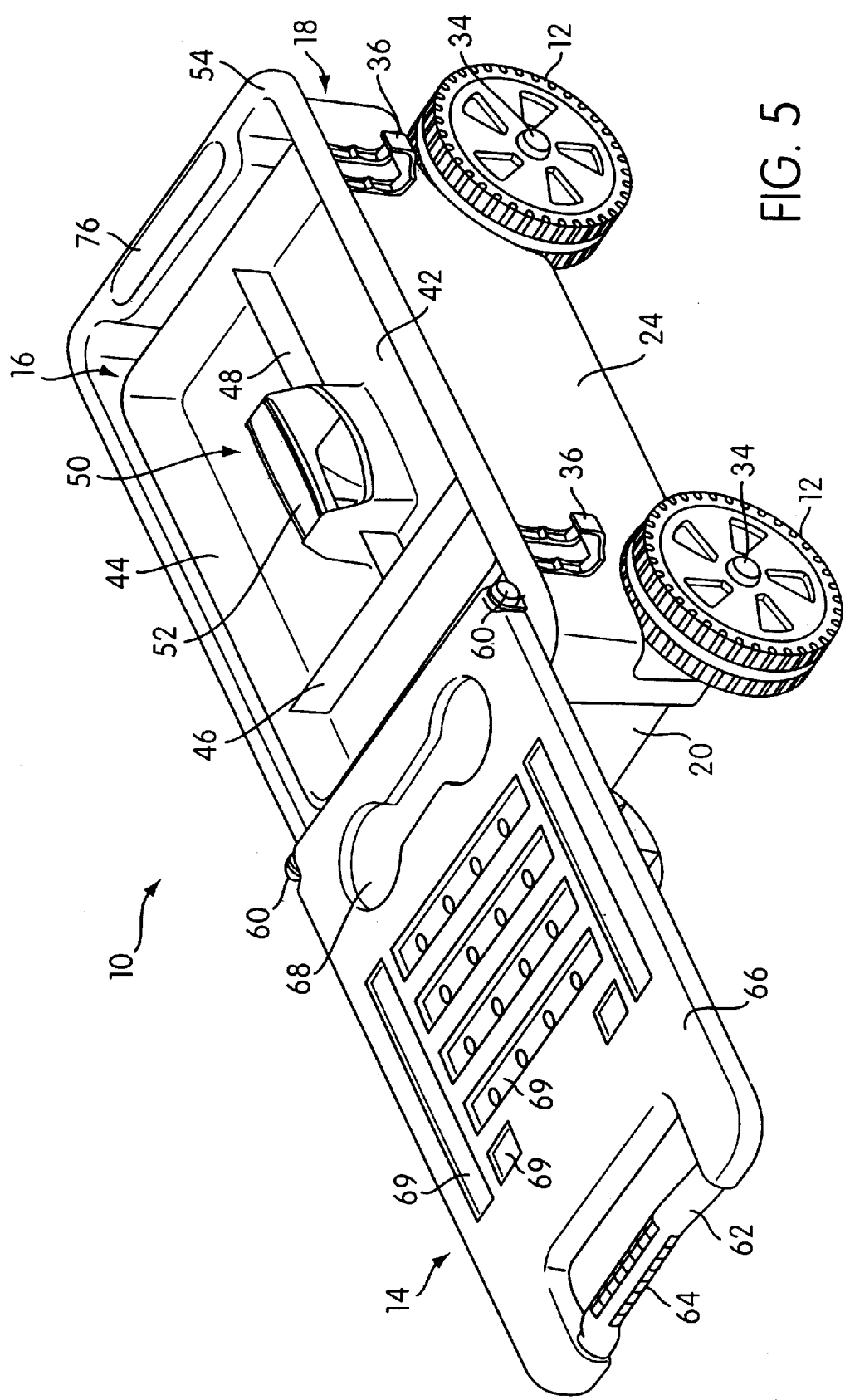
FIG. 5 shows a forward perspective view of the wagon assembly of FIG. 1 with the handle structure folded down to its forwardmost operative position.

The handle structure 14 is movable between (1) a work station or stacking position, (2) a forwardly extending stopped position, and (3) a range of operating positions therebetween. The forwardly extending stopped position is illustrated in FIG. 5. In this position, the handle structure 14 extends forwardly with respect to the wagon body structure 18. A forward portion of the upper periphery 54 of the wagon body structure 18 supports the handle structure 14 in this position such that the gripping portion 62 is maintained in spaced relation to a ground surface on which the wagon assembly 10 is disposed. In this stopped position, it is not necessary for the user to bend down to the ground and grab the gripping portion 62 of the handle structure 14 because the gripping portion 62 is maintained in spaced relation above the ground. Thus, when using the wagon assembly 10 over a long period of time, it is not necessary to repeatedly bend down to the ground in order to grab the gripping portion 62 and move the wagon assembly 10. By avoiding such repeated bending motions, aggravation of physical problems such as back problems and knee problems associated with repeated bending motions are substantially avoided. Even those with such existing physical problems will find it easy to reach the gripping portion 62 when it is maintained in spaced relation to the ground surface in the stopped position.

In addition, in this stopped position, the handle structure 14 also provides a working surface on which a user may arrange items and materials used in gardening and lawn care. The working surface 66 includes a container holding recess 68 which comprises two connected circular recesses. This container holding recess 68 provides a location where a user of the wagon assembly 10 may stably place certain containers, such as plant pots, plant water containers, beverage containers, etc. The working surface 66 also includes a number of rectangular recesses 69 of varying sizes and shapes. These rectangular recesses 69 function to provide areas where a user may place smaller articles so that the articles do not roll or slide off of the working surface 66.

Figure 3:
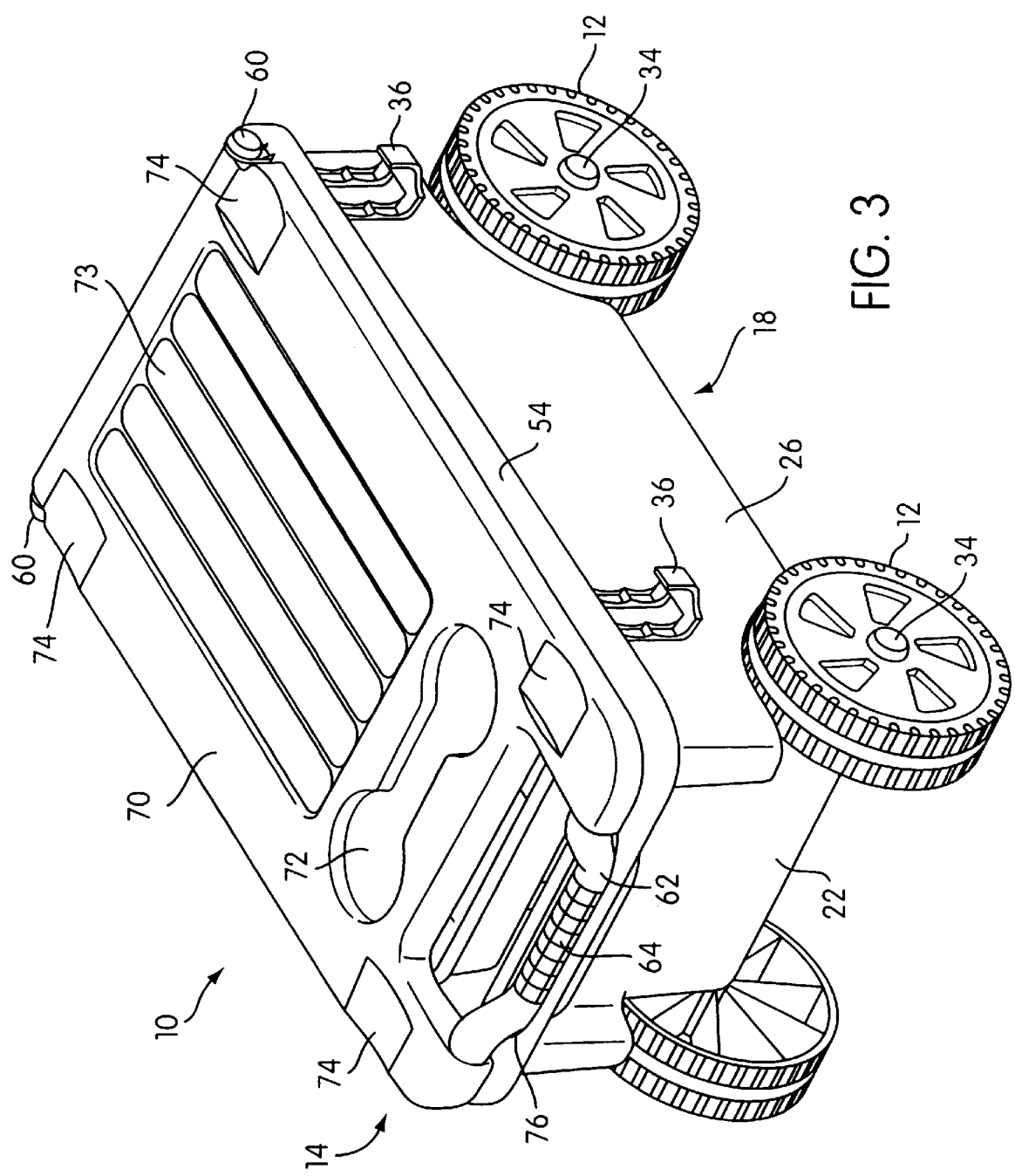
FIG. 3 shows the wagon assembly of FIG. 1 with the handle structure folded down to a work station position wherein it extends rearwardly with respect to the wagon body structure.

The stacking or work station position is illustrated in FIG. 3. In the work station position, the handle structure 14 is folded back such that it extends rearwardly with respect to the wagon body structure 18 and is supported by upwardly facing handle supporting surfaces, in the form of the upper periphery 54 of the wagon body structure 18, with the gripping portion 62 disposed in a grip portion receiving recess 76 formed integrally with the upper periphery 54. The handle structure 14 may be moved to this work station position with or without the removable tray structure 16 in place. In the work station position, the handle structure 14 provides an upwardly facing work station surface 70. The work station surface 70 has a container holding recess 72 similar to that of the container holding recess 68 on the working surface 66 and a set of rectangular recesses 73 which provide areas where a user may place smaller items without having those smaller items roll or slide off of the work station surface 68.

The work station surface 70 also has an upwardly facing stacking recess 74 located near each corner thereof. The upwardly facing stacking recesses 74 are arcuate, concave recesses which face upwardly when the handle structure 14 is in the stacking or work station position. By virtue of the stacking recesses 74 a plurality of wagon assemblies 10 may be arranged on top of one another in a stacked relation. An upper wagon assembly 10 may be stacked on top of a lower wagon assembly 10 by aligning the wheel structures 12 of the upper wagon assembly 10 within the upwardly facing stacking recesses 74 of the lower wagon assembly 10. The arcuate, concave shape of the stacking recesses 74 prevents the upper wagon assembly 10 from rolling with respect to the handle structure 14 of the lower wagon assembly 10. Thus, a plurality of wagon assemblies 10 may be stacked on top of one another in a stable relation in such a manner. It is also further contemplated that a stack of these wagon assemblies may be tied or strapped together in order to further stabilize the stack for shipping or storage.

The wagon body structure also preferably includes a set of partitioned compartments 80, 82, 84. These partitioned compartments 80, 82, 84 are separated from the remainder of the main compartment 30 by a laterally extending partition 86 which extends between the side walls 24, 26 of the wagon body structure 18. Two longitudinally extending partitions 88, 90 extend between the rear wall 22 of the wagon body structure 18 and the laterally extending partition 86 to define the three partitioned compartments 80, 82, 84. These partitioned compartments provide space for storing and carrying items separate from those carried in the remainder of the main compartment 30 in addition to the separate storage space provided by the removable tray structure 16.

It will thus be seen that the objects of the present invention have been fully and effectively accomplished. It will be realized, however, that the foregoing preferred specific embodiment has been shown and described for the purpose of illustrating the functional and structural principles of the present invention and is subject to change without departure from such principles.

What is claimed is:

1. A wagon assembly for transporting items and articles to be used in gardening and lawn care comprising:

a wagon body structure constructed and arranged to provide a main compartment configured such that the articles and items to be used in gardening and lawn care can be stored therein; wheel structures rotatably connected to said wagon body structure, said wheel structures being constructed and arranged to rollingly support said wagon assembly; and a handle structure pivotally attached to said wagon body and having a pair of generally opposed surfaces, said handle structure being constructed and arranged to be moved between a range of operating positions wherein said handle structure extends forwardly with respect to said wagon body structure such that said wagon assembly can be rolled on said wheel structures by manually pulling on said handle and a stacking position wherein said handle structure extends rearwardly with respect to said wagon body structure so that one of said pair of generally opposed surfaces faces generally upwardly to provide a stacking surface;

said main compartment having interior surfaces including tray support members spaced apart on at least some of said interior surfaces so as to provide support for a tray within said main compartment;

a tray having a bottom surface and a peripheral wall extending upwardly from said bottom surface of said tray, said tray being of a size to fit within said main compartment when said tray is placed on said tray support members, said stacking surface of said handle structure of said wagon body including wheel supporting portions which face upwardly when said handle structure is in the stacking position thereof, said wheel supporting portions being constructed and arranged to nestingly receive and support wheel structures of another wagon assembly having substantially the same dimensions to be stacked on top of said wagon assembly when said handle structure of said wagon assembly is in the stacking position and said another wagon assembly is stably stacked on top of said wagon assembly so that rolling movement of the another wagon assembly is restricted by virtue of the nestingly received relationship between the wheel structures of said another wagon assembly stacked on top of said wagon assembly and said wheel support portions.

2. The wagon assembly as claimed in claim 1 wherein said tray includes at least one partition wall therein.

3. The wagon assembly as claimed in claim 1 wherein said tray includes a handle.

4. The wagon assembly as claimed in claim 3 wherein said handle is formed integrally with said tray.

5. The wagon assembly as claimed in claim 1 wherein said main compartment having an upper edge and said tray support members each being spaced from said upper edge so that said tray when positioned on said tray support members is supported within said main compartment.

6. The wagon assembly as claimed in claim 1 wherein said wheel supporting portions are recesses formed on said stacking surface of said handle structure, said recesses being positioned and configured to face generally upwardly with respect to said wagon body structure when said handle structure is in the stacking position.

7. The wagon assembly as claimed in claim 6 wherein said recesses on said stacking surface of said handle structure have an arcuate shape such that the wheel structures of said another wagon assembly are nestingly received and supported by said recesses when said handle structure is in the stacking position and said another wagon assembly is stably stacked on top of said wagon assembly.

* * * * *